(12) United States Patent
Kim

(10) Patent No.: US 8,342,296 B2
(45) Date of Patent: Jan. 1, 2013

(54) DISK BRAKE FOR VEHICLES

(75) Inventor: Myoung June Kim, Gyeonggi-do (KR)

(73) Assignee: Mando Corporation, Gyeonggi-Do (KR)

( * ) Notice: Subject to any disclaimer, the term of this patent is extended or adjusted under 35 U.S.C. 154(b) by 153 days.

(21) Appl. No.: 12/825,439

(22) Filed: Jun. 29, 2010

(65) Prior Publication Data

US 2010/0258388 A1 Oct. 14, 2010

(30) Foreign Application Priority Data

Jul. 2, 2009 (KR) .................. 10-2009-0060060

(51) Int. Cl.
*F16D 55/48* (2006.01)
(52) U.S. Cl. ............... 188/72.8; 188/71.9; 188/70 B; 188/72.3
(58) Field of Classification Search .......... 188/71.1, 188/70 B, 71.9, 72.1, 72.2, 72.3, 72.7, 72.8, 188/162, 73.1, 73.4
See application file for complete search history.

(56) References Cited

U.S. PATENT DOCUMENTS

| | | | | |
|---|---|---|---|---|
| 2,949,979 | A * | 8/1960 | Carroll | 188/77 R |
| 4,591,028 | A * | 5/1986 | Hagiwara et al. | 188/72.2 |
| 5,203,438 | A * | 4/1993 | Ide | 192/107 C |
| 5,573,314 | A * | 11/1996 | Akita et al. | 303/10 |
| 6,491,138 | B1 * | 12/2002 | Spagele | 188/70 B |
| 6,802,402 | B2 * | 10/2004 | Bausch et al. | 188/171 |
| 6,932,198 | B2 * | 8/2005 | Trinh | 188/72.7 |
| 7,114,600 | B2 * | 10/2006 | Boisseau | 188/72.7 |
| 7,438,162 | B2 * | 10/2008 | Eiband | 188/171 |
| 7,661,343 | B2 * | 2/2010 | Gass et al. | 83/62.1 |
| 2005/0145449 | A1 * | 7/2005 | Jelley et al. | 188/72.7 |
| 2008/0185240 | A1 * | 8/2008 | Cao et al. | 188/72.2 |
| 2008/0296102 | A1 * | 12/2008 | Cao et al. | 188/72.2 |
| 2010/0116599 | A1 * | 5/2010 | Kim | 188/72.8 |
| 2010/0258386 | A1 * | 10/2010 | Vollert et al. | 188/72.2 |
| 2011/0083927 | A1 * | 4/2011 | Herges et al. | 188/72.2 |
| 2011/0127123 | A1 * | 6/2011 | Chun | 188/72.7 |

FOREIGN PATENT DOCUMENTS

DE 19850678 C1 * 3/2000

* cited by examiner

*Primary Examiner* — Bradley King
*Assistant Examiner* — Thomas Irvin
(74) *Attorney, Agent, or Firm* — McDermott Will & Emery LLP

(57) ABSTRACT

Disclosed herein is a disk brake for vehicles including a disk rotated together with a wheel of a vehicle, a pair of friction pads disposed at both sides of the disk opposite to each other, and a pair of wedge members installed on the rear surfaces of the friction pads, wherein the upper ends of the friction pads are respectively hinged to the wedge members, and the lower ends of the friction pads are supported by elastic members so as to be protruded toward the disk. Even though friction between the disk and the friction pads occurs under the condition that braking is not performed, the friction is limited to regions between the edges of the lower ends of the friction pads and the disk, thereby reducing frictional force between the disk and the friction pads and thus preventing unintended braking.

4 Claims, 3 Drawing Sheets

DISK BRAKE FOR VEHICLES

CROSS-REFERENCE TO RELATED APPLICATION

This application claims the benefit of Korean Patent Application No. 2009-0060060, filed on Jul. 2, 2009 in the Korean Intellectual Property Office, the disclosure of which is incorporated herein by reference.

BACKGROUND

1. Field

Embodiments of the present invention relate to a disk brake for vehicles in which friction pads are pressurized toward a disk through wedge members.

2. Description of the Related Art

In general, a disk brake is an apparatus which obtains braking force by pressurizing the outer surface of a disk, rotated together with a wheel, with friction pads. Among disk brakes, there is an Electro Wedge Brake (EWB) in which friction pads are pressurized toward a disk using wedge members in an inclined plane sliding manner. In such a EWB, for example, the wedge members are pushed along inclined planes by a driving device, and thus pressurize the friction pads toward the disk.

A EWB for vehicles includes a driving motor to operate wedge members, a screw shaft connected to a rotary shaft of the driving motor, the wedge members connected to the screw shaft so as to move forwards and backward in a direction parallel with the disk by means of operation of the driving motor, and a caliper housing provided with wedge parts formed in a shape corresponding to the wedge members to pressurize the wedge members toward the disk.

In the EWB, when the driving motor is operated to move the wedge members in one direction, the friction pads contact the disk, and simultaneously, the wedge members are pushed along inclined planes of the wedge parts to more firmly pressurize the friction pads toward the disk, thereby performing braking.

However, in case of such a conventional EWB for vehicles, if adhesion occurs due to moisture or other foreign substances between the disk and the wedge members under the condition that intervals between the disk and the wedge members are not sufficiently obtained due to vibration generated during driving of a vehicle, the friction pads may be attracted in the rotating direction of the disk according to rotation of the disk, and thereby unintended braking may be performed.

SUMMARY

Therefore, it is an aspect of the present invention to provide a disk brake for vehicles which prevents generation of braking force in an unintended state.

Additional aspects of the invention will be set forth in part in the description which follows and, in part, will be obvious from the description, or may be learned by practice of the invention.

In accordance with one aspect of the present invention, a disk brake for vehicles includes a disk rotated together with a wheel of a vehicle, a pair of friction pads disposed at both sides of the disk opposite to each other, and a pair of wedge members installed on the rear surfaces of the friction pads, wherein the upper ends of the friction pads are respectively hinged to the wedge members, and the lower ends of the friction pads are supported by elastic members so as to be protruded toward the disk.

The disk brake for vehicles may further include a pair of back plates fixed to the rear surfaces of the friction pads, and the upper ends of the back plates may be respectively hinged to the wedge members and thus the friction pads may be respectively hinged to the wedge members through the back plates.

Hinge protrusions to rotatably install the back plates on the wedge members may be respectively protruded from both sides of the upper ends of the back plates, and hinge parts, at which the hinge protrusions are rotatably installed, may be formed on the wedge members.

Receipt holes to receive the elastic members may be depressed on the wedge members.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
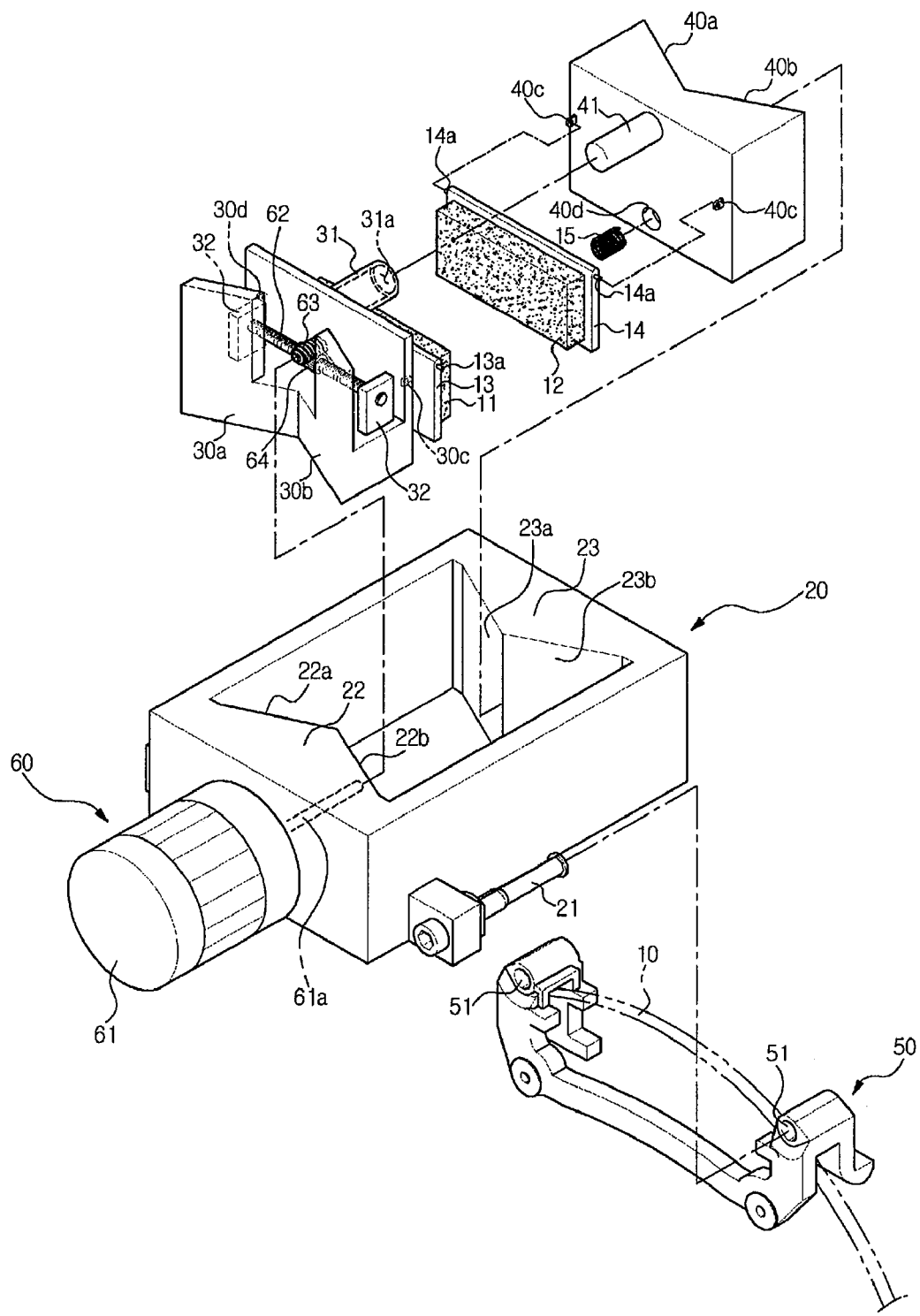
FIG. 1 is an exploded perspective view schematically illustrating a disk brake for vehicles in accordance with one embodiment of the present invention.

Reference will now be made in detail to the embodiments of the present invention, examples of which are illustrated in the accompanying drawings, wherein like reference numerals refer to like elements throughout.

Figure 2:
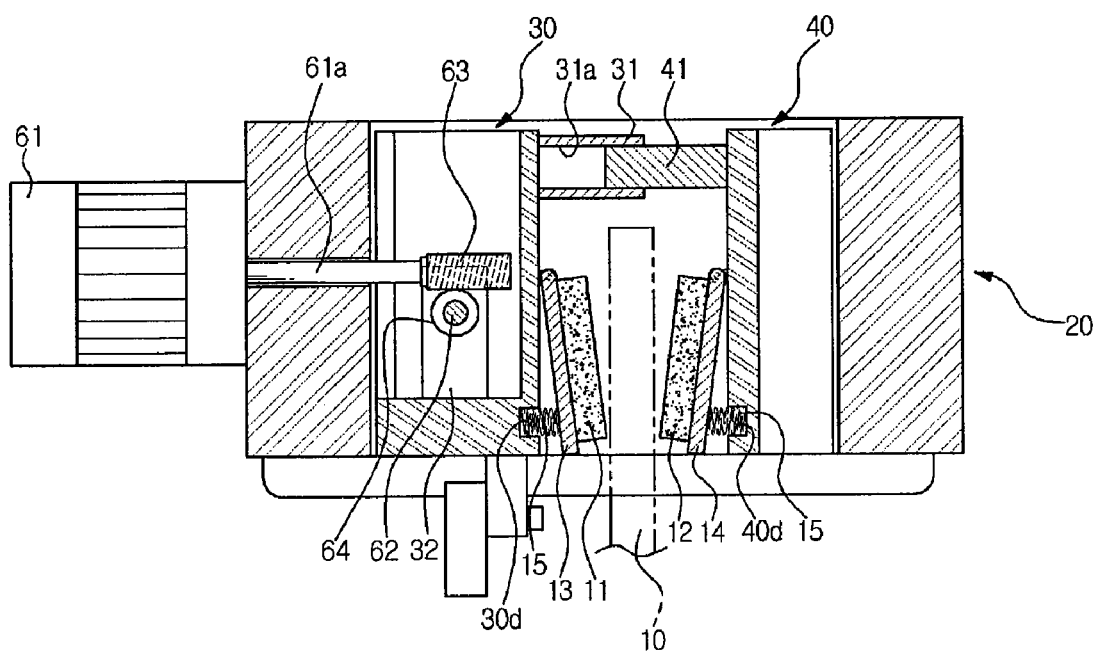
FIGS. 2 and 3 are longitudinal-sectional views illustrating operation of the disk brake for vehicles in accordance with the embodiment of the present invention.

As shown in FIGS. 1 and 2, a disk brake for vehicles in accordance with one embodiment of the present invention includes a disk 10 rotated together with a wheel (not shown) of a vehicle, a pair of friction pads 11 and 12 respectively disposed at both sides of the disk 10 to brake the disk 10, a caliper housing 20 and a pair of wedge members 30 and 40 to pressurize the two friction pads 11 and 12 toward the disk 10, and a driving device 60 to operate the pair of wedge members 30 and 40 so as to pressurize the two friction pads 11 and 12.

The two friction pads 11 and 12 include an inner friction pad 11 rubbing against the inner surface of the disk 10, and an outer friction pad 12 rubbing against the outer surface of the disk 10. The two friction pads 11 and 12 are supported by a carrier 50 fixed to a knuckle part (not shown) of the vehicle so as to move forwards and backwards relative to the disk 10, thereby being capable of pressurizing both surfaces of the disk 10. The caliper housing 20 is connected to guide holes provided on both sides of the carrier 50 through guide rods 21 connected to both sides of the caliper housing 20 such that the caliper housing 20 may move forwards and backwards. As the inner friction pad 11 rubs against the inner surface of the disk 10, the caliper housing 20 moves backwards from the disk 10 and pressurizes the outer surface of the outer friction pad 12, thereby causing the outer friction pad 12 to rub against the outer surface of the disk 10.

The pair of wedge members 30 and 40 includes an inner wedge member 30 installed on the rear surface of the inner friction pad 11, and an outer wedge member 40 installed on the rear surface of the outer friction pad 12. An inner wedge part 22 and an outer wedge part 23 opposite to each other are provided on both inner sidewalls of the caliper housing 20 facing inclined planes of the two wedge members 30 and 40. That is, the inner friction pad 11 and the outer friction pad 12 are disposed in the caliper housing 20 opposite to each other under the condition that the inner friction pad 11 and the outer friction pad 12 are respectively installed on the inner wedge member 30 and the outer wedge member 40, and the disk 10 is disposed between the inner friction pad 11 and the outer friction pad 12.

Inclined planes 30a, 30b and 40a, 40b, which are bilaterally symmetrical to form V-shaped valleys, are provided on the rear surfaces of the two wedge members 30 and 40 provided with the front surfaces on which the friction pads 11 and 12 are installed, and the inner wedge part 22 and the outer wedge part 23 are provided with inclined planes 22a, 22b and 23a, 23b forming V-shaped mountains opposite to the inclined planes 30a, 30b and 40a, 40b of the two wedge members 30 and 40.

The inner wedge member 30 and the outer wedge member 40 include a first guide bar 31 and a second guide bar 41 protruded opposite to each other and movably installed such that the inner wedge member 30 and the outer wedge member 40 may move forwards and backwards relative to the disk 10. In this embodiment, a guide hole 31a into which the second guide bar 41 is movably inserted is formed through the first guide bar 31, and thus the inner wedge member 30 and the outer wedge member 40 are installed such that they may move forwards and backwards through the first guide bar 31 and the second guide bar 41.

The driving device 60 is installed on the outer surface of the inner wedge part 22. The driving device 60 includes a driving motor 61 provided with a rotary shaft 61a passing through the inner wedge part 22 in a pressurizing direction of the inner friction pad 11, a screw shaft 62 meeting the rotary shaft 61a of the driving motor 61 at right angles and disposed parallel with the disk 10, a worm 63 installed at the front end of the rotary shaft 61a, and a worm wheel 64 mounted at the center of the screw shaft 62 so as to be connected to the worm 63. Guide parts 32 to which the screw shaft 62 is screw-connected are formed on the inner wedge member 30 such that the inner wedge member 30 may move by receiving driving force transmitted through the screw shaft 62.

In order to minimize frictional force between the disk 10 and the friction pads 11 and 12 even though friction between the disk 10 and the friction pads 11 and 12 occurs under the condition that braking is not performed, the upper ends of the two friction pads 11 and 12 are rotatably installed on the wedge members 30 and 40 and the lower ends of the two friction pads 11 and 12 are elastically supported by elastic members 15 so as to be protruded toward the disk 10.

In this embodiment, back plates 13 and 14 to which the two friction pads 11 and 12 are fixed are respectively disposed on the rear surfaces of the two friction pads 11 and 12, and the upper ends of the two back plates 13 and 14 are rotatably installed on the wedge members 30 and 40 and thus the friction pads 11 and 12 are rotatably installed on the wedge members 30 and 40 through the back plates 13 and 14. Hinge protrusions 13a and 14a to enable the back plates 13 and 14 to be rotatably installed on the wedge members 30 and 40 are respectively protruded from both sides of the upper ends of the back plates 13 and 14, and hinge parts 30c and 40c, at which the hinge protrusions 13a and 14a are rotatably installed, are formed on the wedge members 30 and 40. Further, receipt holes 30d and 40d to receive the entirety or parts of the elastic members 15 to install the elastic members 15 are depressed on the wedge members 30 and 40.

Figure 3:
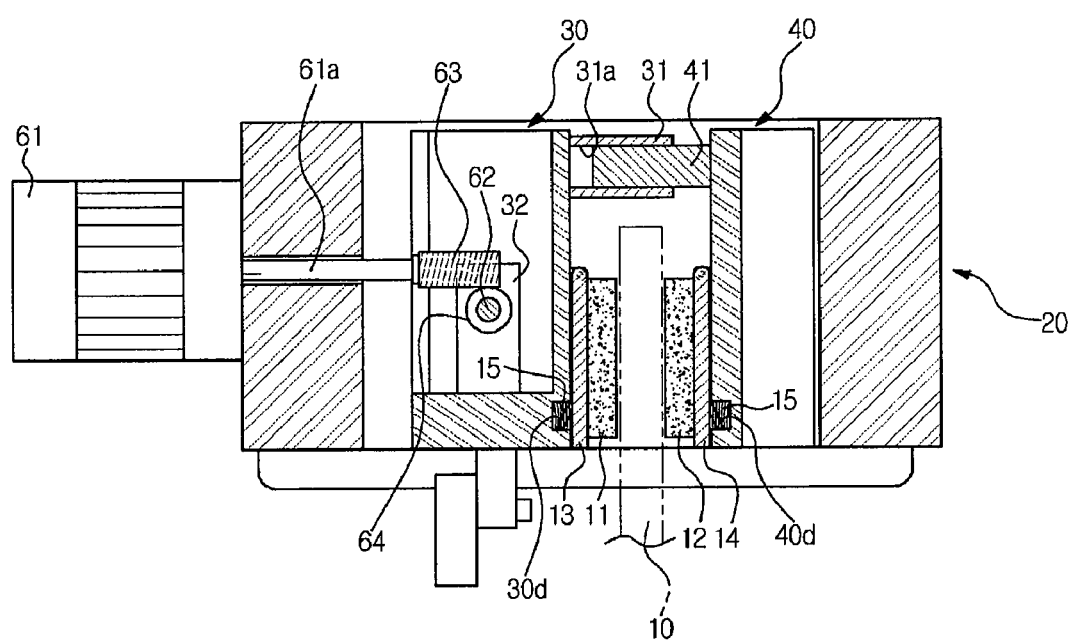

Therefore, as usual when braking is not performed, the lower ends of the back plates 13 and 14 and the friction pads 11 and 12 are protruded toward the disk 10 by means of elastic restoring force of the elastic members 15. Then, during braking, the elastic members 15 are deformed and received in the receipt holes 30d and 40d, and simultaneously, the back plates 13 and 14 and the friction pads 11 and 12 are rotated centering around the upper ends thereof and become parallel with the disk 10, and in this state, the friction pads 11 and 12 rub against the disk 10 and generate braking force, as shown in FIG. 3.

As described above, as usual when braking is not performed, the lower ends of the friction pads 11 and 12 are protruded toward the disk 10, and thus although friction between the disk 10 and the friction pads 11 and 12 occurs, contact regions between the disk 10 and the friction pads 11 and 12 are limited to the edges of the lower ends of the friction pads 11 and 12, and thus frictional force between the disk 10 and the friction pads 11 and 12 is very small. Therefore, unintended braking due to movement of the friction pads 11 and 12 in the rotating direction of the disk 10 by frictional force between the disk 10 and the friction pads 11 and 12 is prevented.

As is apparent from the above description, a disk brake for vehicles in accordance with one embodiment of the present invention, which, even though friction between a disk and friction pads occurs under the condition that braking is not performed, the friction is limited to regions between the edges of the lower ends of the friction pads and the disk, thereby reducing frictional force between the disk and the friction pads and thus preventing unintended braking.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A disk brake for vehicles comprising:
a disk rotated together with a wheel of a vehicle;
a first friction pad disposed at a first side of the disk;
a second friction pad disposed at a second side of the disk;
a first wedge member installed on a rear surface of the first friction pad; and
a second wedge member installed on a rear surface of the second friction pad,
wherein the first wedge member is configured to move along an inclined plane to pressurize the first friction pad towards the disk,
wherein the second wedge member is configured to move along an inclined plane to pressurize the second friction pad towards the disk,
wherein one end of the first friction pad is hinged to the first wedge member, and another end of the first friction pad is supported by a first elastic member so as to be protruded toward the disk,
wherein one end of the second friction pad is hinged to the second wedge member, and another end of the second friction pad is supported by a second elastic member so as to be protruded toward the disk, and
wherein the first elastic member is arranged between the first wedge member and the first friction pad, and the second elastic member is arranged between the second wedge member and the second friction pad.

2. The disk brake for vehicles according to claim 1, further comprising a first back plate fixed to the rear surface of the first friction pad, and a second back plate fixed to the rear surface of the second friction pad,
wherein one end of the first back plate is hinged to the first wedge member, and thus the first friction pad is hinged to the first wedge member through the first back plate, and wherein one end of the second back plate is hinged to the second wedge member, and thus the second friction pad is hinged to the second wedge member through the second back plate.

3. The disk brake for vehicles according to claim 2, wherein:
first hinge protrusions to rotatably install the first back plate on the first wedge member are respectively protruded from both sides of the one end of the first back plate;
first hinge parts, at which respective first hinge protrusions are rotatably installed, are formed on the first wedge member;

second hinge protrusions to rotatably install the second back plate on the second wedge member are respectively protruded from both sides of the one end of the second back plate; and
second hinge parts, at which respective second hinge protrusions are rotatably installed, are formed on the second wedge member.

4. The disk brake for vehicles according to claim 1, wherein a first receipt hole to receive the first elastic member is depressed on the first wedge member, and
wherein a second receipt hole to receive the second elastic member is depressed on the second wedge member.

* * * * *